Patented Feb. 15, 1944

2,341,791

UNITED STATES PATENT OFFICE 2,341,791

YELLOW DISAZO DYESTUFFS

Otto Kaiser, Basel, Switzerland, assignor to the firm of Society of Chemical Industry in Basle, Basel, Switzerland No Drawing. Application March 9, 1942, Serial No. 434,009. In Switzerland November 22, 1940

11 Claims. (Cl. 260—175)

It has been found that certain disazo dyestuffs, which have not hitherto been described, are very valuable colouring matters. These disazo dyestuffs, which are simultaneously urea derivatives, possess, in the free state, the general formula

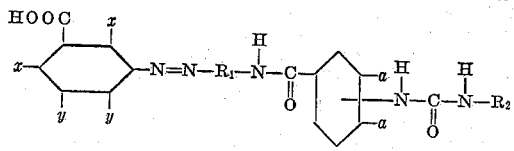

in which one $x$ represents an OH-group, the other $x$ a hydrogen atom, one $y$ represents a $SO_3H$-group, and the other $v$ a hydrogen atom, in which, when the $x$ in the ortho-position to the —N=N— group represents an OH-group, that $y$ in the para-position to this OH-group represents an $SO_3H$-group, in which, also, $R_1$ represents an aromatic nucleus of the benzene series, wherein the —N=N— and the

groups stand in the 1:4 position to one another; further in the above formula a hydrogen atom is present in one position $a$ and the indicated group

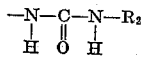

is in the other position $a$, and, finally, the

group represents the radical of a yellow monoamino azo dyestuff wherein the azo-group is united on either side to a nucleus of the benzene series. These dyestuffs, the salts of which—for example, the sodium salt—are yellow, orange, reddish or brown powders, dissolve in water to form yellow solutions. In their neutral or weakly alkaline solutions, they possess an excellent affinity for natural or regenerated cellulose, for example, in the form of cotton, ramie, flax, viscose or cuprammonium rayon—which may also be in the form of staple fiber or of matt rayon which has been delustered with inorganic pigments—and mixtures of these and similar fibers with one another or with animal fibers, such as wool and silk. The dyeing process may take place in the presence or in combination with acid or mordant wool dyestuffs. On the materials named, the new dyestuffs produce yellow shades which, by aftertreatment with suitable metal salts, for example, chromium, copper, cobalt, or nickel salts, may be developed, whereby the fastness of the dyeings to wet agents and to light may be bettered appreciably.

These dyestuffs are most advantageously obtained if 1 molecule of the azo dyestuff of the general formula

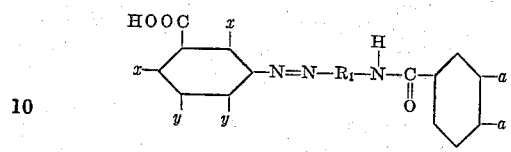

in which $x$, $y$ and $R_1$ have the significance given above, and the one $a$ represents a hydrogen atom and the other $a$ an $NH_2$-group, be united with 1 molecule of an azo dyestuff of the general formula

in which the radical

has the significance already given, by treatment with phosgene to form the corresponding urea.

Among the dyestuffs of the general formula already explained

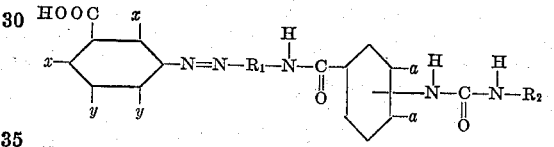

those which are asymmetric urea derivatives in which the $xx$, the $yy$, $R_1$ and the $aa$ have the meaning already given in the first paragraph of this specification, and in which the

group stands for the radical of a monoamino-monoazo dyestuff selected from the group of the 4-aminoazobenzenes, are of particular value. These asymmetric dyestuffs are remarkable for their high tinctorial power, so that, in view of their other very valuable properties, they form particularly valuable products.

Products which correspond to the parent dyestuffs of the general formula

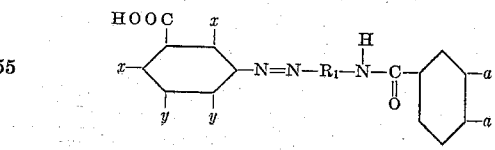

which has already been explained, are for example, 4'-(4''-amino)-benzoylamino - 1:1' - azobenzene - 4 - hydroxy-3-sulfo-5-carboxylic acid, 4'-(3''-amino)-benzoylamino - 1:1' - azobenzene-4-hydroxy-3-sulfo-5-carboxylic acid, 4'-(4''-amino)-benzoylamino-1:1'-azobenzene - 2' - methyl-5'-methoxy-4-hydroxy-3-sulfo-5-carboxylic acid, 4'-(4''-amino)-benzoyl - amino-1:1'-azobenzene-3'-methoxy-4-hydroxy-3-sulfo-5-carboxylic acid, 4'-(3''-amino)-benzoylamino-1:1' - azobenzene-3' - methyl-2-hydroxy-5-sulfo-3-carboxylic acid, 4'-(3'' - amino)-benzoylamino-1:1'-azobenzene-2' - acetylamino-5'-methoxy-4-hydroxy-3-sulfo-5-carboxylic acid, 4'-(3'''-amino)-benzoylamino-1:1'-azobenzene-2'-methyl-5'-methoxy - 4 - hydroxy-3-carboxy-5-sulfonic acid, and so on.

In addition to the above mentioned products, their analogues and homologues, for example, more simple compounds can be used as parent substances of the general form R₂—NH₂, for example, 4-aminoazobenzene compounds such as 4'-amino-1 : 1'-azobenzene-4-hydroxy-3-carboxylic acid, 4'-amino-2'-methyl-1:1'-azobenzene-4- or 3-sulfonic acid, 4'-amino-2'-methyl-1:1'-azobenzene-4-hydroxy-3-carboxylic acid, 4'-amino-5'-methoxy-2'-methyl-1 : 1'-azobenzene - 4-chloro-3-sulfonic acid, 4'-amino-5'-methoxy-2'-methyl-1:1'-azobenzene-2-carboxylic acid, 4'-amino-3'-methoxy-4-hydroxy-1:1' - azobenzene-3-carboxylic acid, 4'-amino-3'-methyl-4-hydroxy-1:1'-azobenzene-3-carboxylic acid, 2'-methoxy-5'-amino-1:1'-azobenzene-4-hydroxy - 3 - carboxylic acid, 3' - methyl-5'-amino-4-hydroxy - 1:1'-azobenzene-3-carboxylic acid, etc.

The following examples illustrate the present invention without, however, limiting the scope of the same:

*Example 1*

76.2 parts of the monoazo dyestuff obtained from diazotized 1-amino-4-hydroxybenzene-3-carboxy-5-sulfonic acid and 1-methyl-3-amino-4-methoxybenzene are dissolved in 500 parts of water as the sodium salt by addition of 27 parts of sodium acetate. This solution is treated at about 60° C. with 39 parts of 4-nitrobenzoyl chloride, to which has been added 10 parts of acetone. The nitrobenzoyl product formed is reduced to the aminobenzoyl product at 65–70° C. with 84 parts of crystalline sodium sulphide, dissolved in 150 parts of water. The reduction product which separates is dissolved in 2000 parts of water by adding sodium carbonate until a definite alkaline reaction is obtained, and it is then treated for 24 hours whilst stirring at 30–40° C. with phosgene until no free NH₂-group can be detected. The urea derivative which separates out is precipitated as the sodium salt, filtered and dried. In the free state it corresponds to the formula

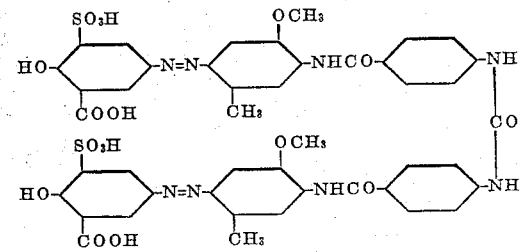

It is a yellow powder and dyes cotton in greenish-yellow tones fast to washing from a weakly alkaline dye bath, to which has been added a copper solution containing copper sulphate and sodium tartrate.

If the 1-methyl-3-amino-4-methoxybenzene in the above example be replaced by 1-methyl-3-aminobenzene or by 1:4-dimethoxy-2-aminobenzene or 1:4-dimethyl-2-aminobenzene, dyestuffs are obtained which dye cotton in similar shades. In place of 4-nitrobenzoyl chloride, 3-nitrobenzoyl chloride or its derivatives can be used.

*Example 2*

70.2 parts of the monoazo dyestuff obtained from diazotized 1-amino-2-hydroxybenzene-3-carboxy-5-sulfonic acid and 1-methyl-3-aminobenzene are dissolved as the sodium salt in 500 parts of water by addition of 27 parts of sodium acetate, 39 parts of 4-nitrobenzoyl chloride, to which have been added 10 parts of acetone, are used to treat the solution at about 60° C. The nitrobenzoyl product formed is reduced with 84 parts of crystalline sodium sulfide, dissolved in 150 parts of water, at 65–70° C. to yield the aminobenzoyl product.

The precipitated reduction product is dissolved in 2000 parts of water by addition of sodium carbonate until a definitely alkaline reaction is obtained and is treated with phosgene for 24 hours at 30–40° C. until no free NH₂-group can be detected. The urea derivative formed, which, in the free state, has the formula

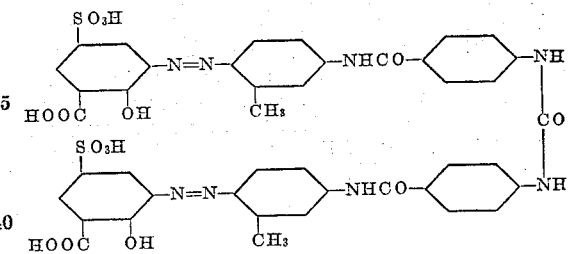

is precipitated as the sodium salt, filtered and dried. It is a yellow powder and dyes cotton in reddish yellow tones fast to washing from a weakly alkaline dye bath, to which has been added a copper solution containing copper sulphate and sodium tartrate.

If the 1-methyl-3-aminobenzene is this example be replaced by 1-methyl-3-amino-4-methoxybenzene or 1:4-dimethoxy-2-aminobenzene, dyestuffs are obtained which dye rather redder shades on cotton. Similar dyestuffs are also obtained if the 4-nitrobenzoyl chloride be replaced by 3-nitrobenzoyl chloride.

*Example 3*

38.1 parts of the monoazo dyestuff obtained from diazotized 1-amino-4-hydroxybenzene-3-carboxy-5-sulfonic acid and 1-methyl-3-amino-4-methoxybenzene are dissolved in 250 parts of water as the sodium salt by addition of 13.5 parts of sodium acetate. This solution is treated at 60° C. with 18.5 parts of 4-nitrobenzoyl chloride, to which has been added 5 parts of acetone. The nitrobenzoyl product formed is reduced with 42 parts of crystalline sodium sulphide, dissolved in 75 parts of water, at 65–70° C. to the aminobenzoyl product.

50 parts of the isolated reduction product are dissolved in 2000 parts of water, together with 37.6 parts of 4'-(4''-amino)-benzoylamino-1:1'-azobenzene-4-hydroxy-3-carboxylic acid, by addition of sodium carbonate until a definitely alkaline reaction is obtained, and this reaction mixture is treated with phosgene for 24 hours with stirring at 30–40° C. until no free NH₂-group can be detected. The urea derivative is precipitated as the sodium salt, filtered and dried. The new urea corresponds to the formula

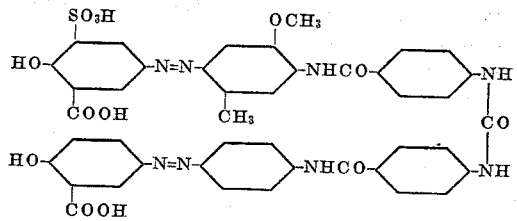

It is a yellow powder and dyes cotton in greenish yellow shades fast to washing from a weakly alkaline dye bath, to which has been added a copper solution containing copper sulphate and sodium tartrate.

If the 4'-(4''-amino)-benzoylamino-1:1'-azobenzene-4-hydroxy-3-carboxylic acid be replaced in this example by 4'-(3''-amino)-benzoylamino-1:1'-azobenzene-4-hydroxy-3-carboxylic acid or by 4'-(3''-amino)-benzoylamino-2'-methyl-1:1'-azobenzene-4-hydroxy-3-carboxylic acid, dyestuffs are obtained which dye cotton in similar shades.

*Example 4*

35.1 parts of the monoazo dyestuff derived from diazotized 1-amino-2-hydroxybenzene-3-carboxy-5-sulfonic acid and 1-methyl-3-aminobenzene are dissolved in the form of the sodium salt in 250 parts of water by addition of 13.5 parts of sodium acetate. This solution is treated at about 60° C. with 18.5 parts of 4-nitrobenzoyl chloride, to which have been added 10 parts of acetone. The nitrobenzoyl product formed is reduced with 42 parts of crystalline sodium sulfide, dissolved in 75 parts of water, at 65–70° C. to the aminobenzoyl product. 47 parts of the isolated reduction product are dissolved in 2000 parts of water, together with 27.1 parts of 4-amino-2-methyl-4'-hydroxy-1:1'-azobenzene-3'-carboxylic acid, by addition of sodium carbonate until a definitely alkaline reaction is obtained and are treated with phosgene for 24 hours at 30–40° C., with stirring, until no free NH₂-group can be detected. The separated urea derivative is precipitated as the sodium salt, filtered and dried. In the free state it possesses the formula

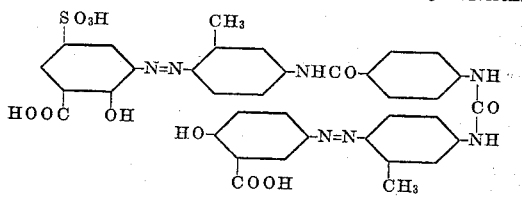

It is a yellow powder and dyes cotton in reddish-yellow shades fast to washing from a weakly alkaline dye bath, to which has been added a copper solution containing copper sulphate and sodium tartrate.

If the 1-amino-2-hydroxybenzene-3-carboxy-5-sulfonic acid in the present example be replaced by 1-amino-4-hydroxybenzene-3-carboxy-5-sulfonic acid, dyestuffs are obtained which dye cotton in yellow shades. The 4-amino-2-methyl-4'-hydroxy-1:1'-azobenzene-3'-carboxylic acid can be replaced by, among other things, 4-amino-4'-hydroxy-1:1'-azobenzene-3'-carboxylic acid or by 4-amino-4'-hydroxy-5'-methyl-1:1'-azobenzene-3'-carboxylic acid or also by 4-amino-1:1'-azo-3-methoxybenzene-3'-sulfonic acid.

Ureas of this type correspond, in the free state, to the formulae:

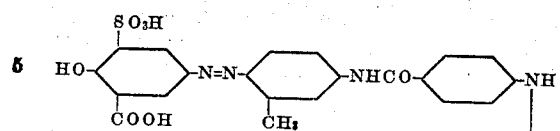

or

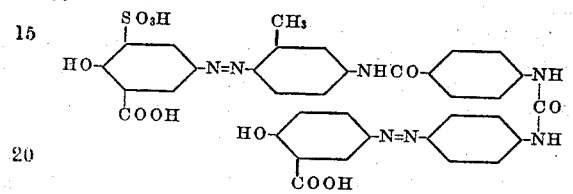

In place of 1-methyl-3-aminobenzene, 1-methyl-3-amino-4-methoxybenzene or 1:4-dimethoxy-2-aminobenzene can be used. In this way, a dyestuff possessing the formula

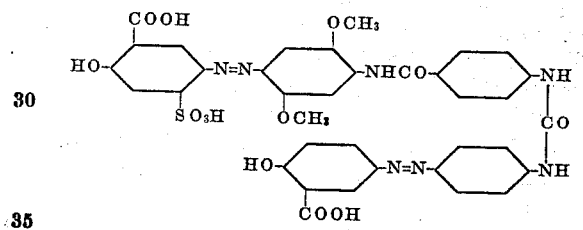

in the free state can be obtained.

*Example 5*

38.1 parts of the monoazo dyestuff obtained from diazotized 1-amino-4-hydroxybenzene-3-carboxy-5-sulfonic acid and 1-methyl-3-amino-4-methoxybenzene are dissolved in 250 parts of water as the sodium salt by addition of 13.5 parts of sodium acetate. This solution is treated at 60° C. with 18.5 parts of 4-nitrobenzoyl chloride, to which has been added 5 parts of acetone. The nitrobenzoyl product formed is reduced with 42 parts of crystalline sodium sulphide, dissolved in 75 parts of water, at 65–70° C. to the aminobenzoyl product.

50 parts of the isolated reduction product are dissolved in 2000 parts of water, together with 25.7 parts of 4-amino-4'-hydroxy-1:1'-azobenzene-3'-carboxylic acid, by addition of sodium carbonate until a definitely alkaline reaction is obtained. The reaction mixture is then treated with phosgene whilst stirring at 30–40° C. until no free amino group can be detected. The separated urea derivative, which corresponds to the formula

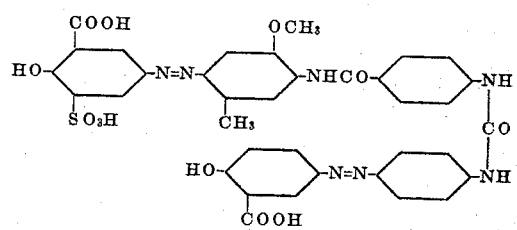

in the free state, is precipitated as the sodium salt, filtered and dried. It is a yellow powder and dyes cotton in greenish-yellow shades fast to washing from a weakly alkaline dye bath, to which has been added a copper solution containing copper sulphate and sodium tartrate.

If the 4-amino-4'-hydroxy-1:1'-azobenzene-3-carboxylic acid in the present example be replaced by 4-amino-2-methyl-4'-hydroxy-1:1'-azobenzene-3'-carboxylic acid, a dyestuff is obtained which dyes cotton in similar shades.

*Example 6*

38.1 parts of the monoazo dyestuff derived from diazotized 1-amino-2-hydroxybenzene-3-carboxy-5-sulfonic acid and 1-methyl-3-amino-4-methoxybenzene are dissolved in 250 parts of water as the sodium salt by addition of 13.5 parts of sodium acetate. This solution is treated at 60° C. with 18.5 parts of 3-nitrobenzoyl chloride, to which has been added 5 parts of acetone. The nitrobenzoyl product formed is reduced with 42 parts of crystalline sodium sulphide, dissolved in 75 parts of water, at 65–70° C. to the aminobenzoyl product.

50 parts of the isolated reduction product are dissolved in 2000 parts of water, together with 25.7 parts of 4-amino-2-methyl-4'-hydroxy-1:1'-azobenzene-3'-carboxylic acid, by addition of sodium carbonate until a definitely alkaline reaction is obtained. The reaction mixture is then treated with phosgene whilst stirring at 30–40° C. until no free amino group can be detected. The separated urea derivative, which corresponds to the formula

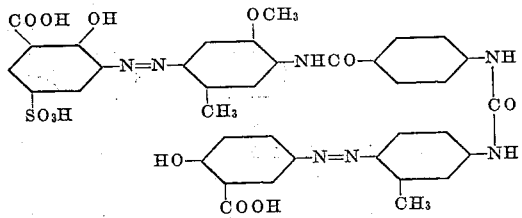

in the free state, is precipitated as the sodium salt, filtered and dried. It is a yellow powder and dyes cotton in reddish-yellow shades fast to washing from a weakly alkaline dye bath, to which has been added a copper solution containing copper sulphate and sodium tartrate.

If, in this example, the 1-methyl-3-amino-4-methoxybenzene be replaced by 1-aminobenzene, and the 4-amino-2-methyl-4'-hydroxy-1:1'-azobenzene-3'-carboxylic acid be replaced by 4-amino-4'-hydroxy-1:1'-azobenzene-3'-carboxylic acid, dyestuffs are obtained which also dye cotton in yellow shades. Furthermore, similar dyestuffs are obtained if the 3-nitrobenzoyl chloride be replaced by 4-nitrobenzoyl chloride.

*Example 7*

A dyebath is prepared containing 3000 parts of water, 1.4 parts of the dyestuff prepared according to Example 1, paragraph 1, and 2 parts of anhydrous sodium carbonate. 100 parts of cotton material are entered at 40–50° C. and the bath is heated during ½ hour to 90–95° C. 30 parts of crystalline sodium sulphate are added and dyeing is continued at this temperature for ¾ hour. A solution consisting of 2 parts of crystallized copper sulfate and 2.5 parts of tartaric acid neutralized with caustic soda and made to 100 parts with water is now added to the dyebath, and the cotton is treated with this liquor for ½ hour at 95° C. It is then rinsed and dried as usual. The cotton is dyed in a fast greenish-yellow shade.

As indicated in the specification, the dyestuffs of this application can be used on composite materials, such as materials consisting of wool-viscose rayon staple fiber. In such cases, the dyestuffs are best dyed in a neutral bath in the presence of sodium or potassium chromate.

What I claim is:

1. The disazo dyestuffs which are urea derivatives and which, in the free state, correspond to the general formula

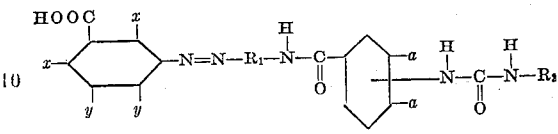

wherein one $x$ stands for an OH-group and the other $x$ for a hydrogen atom, one $y$ for a SO$_3$H-group and the other $y$ for a hydrogen atom, wherein, when the $x$ in the o-position to the —N=N-group stands for an OH-group, that $y$ in the p-position to this OH-group stands for a SO$_3$H-group, wherein, also, R$_1$ stands for an aromatic nucleus of the benzene series in which the —N=N— and the

groups stand in the 1:4-position to one another, wherein further a hydrogen atom is in one position $a$, and the indicated group

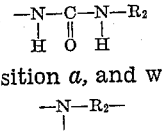

is in the other position $a$, and wherein finally the

group stands for the radical of a yellow monoamino azo dyestuff in which the azo-group is united on either side to a nucleus of the benzene series, which products are yellow to orange, reddish and brown powders which, in the form of their alkaline salts, dissolve in water to form yellow solutions and which dye the cellulose fiber yellow shades the fastness of which to wet agents may be improved by treatment with copper salts.

2. The disazo dyestuffs which are asymmetric urea derivatives and which, in the free state, correspond to the general formula

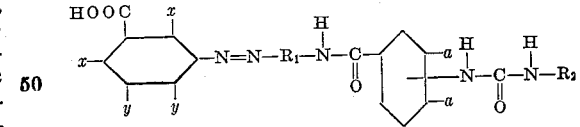

wherein one $x$ stands for an OH-group and the other $x$ for a hydrogen atom, one $y$ for a SO$_3$H-group and the other $y$ for a hydrogen atom, wherein, when the $x$ in the o-position to the —N=N-group stands for an OH-group, that $y$ in the p-position to this OH-group stands for a SO$_3$H-group, wherein, also, R$_1$ stands for an aromatic nucleus of the benzene series in which the —N=N— and the

groups stand in the 1:4-position to one another, wherein further a hydrogen atom is in one position $a$, and the indicated group

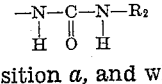

is in the other position $a$, and wherein finally the

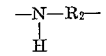

group stands for the radical of a monoamino-monoazo-dyestuff selected from the group of the 4-amino-azobenzene compounds, which products are yellow to orange, reddish and brown powders which, in the form of their alkaline salts, dissolve in water to form yellow solutions and which dye the cellulose fiber yellow shades the fastness of which wet agents may be improved by treatment with copper salts.

3. The disazo dyestuffs which are asymmetric urea derivatives and which, in the free state, correspond to the general formula

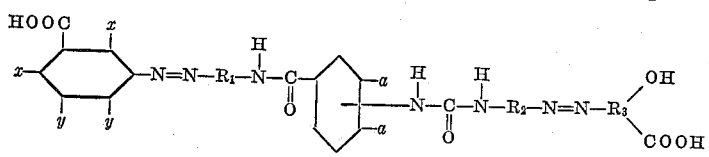

wherein one $x$ stands for an OH-group and the other $x$ for a hydrogen atom, one $y$ for a SO$_3$H-group and the other $y$ for a hydrogen atom, wherein, when the $x$ in the o-position to the —N=N—group stands for an OH-group, that $y$ in the p-position to this OH-group stands for a SO$_3$H-group, wherein, also, R$_1$ and R$_2$ stand for an aromatic nucleus of the benzene series, in which the —N=N— and the

groups stand in the 1:4-position to one another, wherein further a hydrogen atom is in one position $a$ and the indicated group

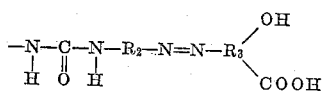

is in the other position $a$, and wherein finally R$_3$ stands for an aromatic nucleus of the benzene series in which the OH-group and the COOH-group stand in o-position to one another, which products are yellow to orange, reddish and brown powders which, in the form of their alkaline salts, dissolve in water to form yellow solutions and which dye the cellulose fiber yellow shades the fastness of which to wet agents may be improved by treatment with copper salts.

4. The disazo dyestuffs which are asymmetric urea derivatives and which, in the free state, correspond to the general formula

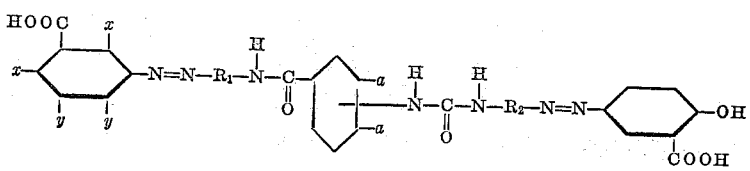

wherein one $x$ stands for an OH-group and the other $x$ for a hydrogen atom, one $y$ for a SO$_3$H-group and the other $y$ for a hydrogen atom, wherein, when the $x$ in the o-position to the —N=N—group stands for an OH-group, the $y$ in the p-position to this OH-group stands for a SO$_3$H-group, wherein, also, R$_1$ and R$_2$ stand for an aromatic nucleus of the benzene series in which the —N=N— and the

groups stand in the 1:4-position to one another, and wherein finally a hydrogen atom is in one position $a$ and the indicated group

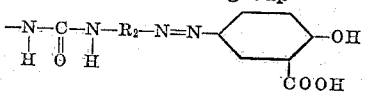

is in the other position $a$, which products are yellow to orange, reddish and brown powders which, in the form of their alkaline salts, dissolve in water to form yellow solutions and which dye the cellulose fiber yellow shades the fastness of which to wet agents may be improved by treatment with copper salts.

5. The disazo dyestuffs which are asymmetric urea derivatives and which, in the free state, correspond to the general formula

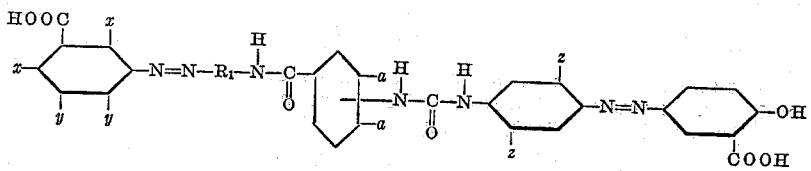

wherein one $x$ stands for an OH-group and the other $x$ for a hydrogen atom, one $y$ for a SO$_3$H-group and the other $y$ for a hydrogen atom, wherein, when the $x$ in the o-position to the —N=N—group stands for an OH-group, that $y$ in the p-position to this OH-group stands for a SO$_3$H-group, wherein, also, R$_1$ stands for an aromatic nucleus of the benzene series in which the —N=N— and the

groups stand in the 1:4-position to one another, wherein further a hydrogen atom is in one position $a$ and the indicated group

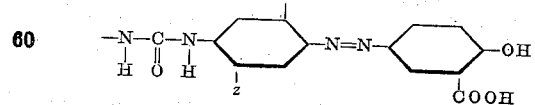

is in the other position $a$, and wherein finally one $z$ stands for hydrogen and the other $z$ for a member of the group consisting of H and CH$_3$, which products are yellow to orange, reddish and brown powders which, in the form of their alkaline salts, dissolve in water to form yellow solutions and which dye the cellulose fiber yellow shades the fastness of which to wet agents may be improved by treatment with copper salts.

6. The disazo dyestuffs which are asymmetric urea derivatives and which, in the free state, correspond to the general formula

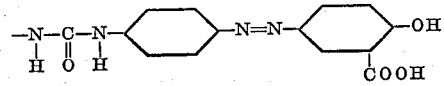

wherein one $x$ stands for an OH-group and the other $x$ for a hydrogen atom, one $y$ for a SO$_3$H-group and the other $y$ for a hydrogen atom, wherein, when the $x$ in the o-position to the —N=N—group stands for an OH-group, that $y$ in the p-position to this OH-group stands for a SO$_3$H-group, wherein, also, R$_1$ stands for an aromatic nucleus of the benzene series in which the —N=N— and the

groups stand in the 1:4-position to one another, and wherein finally a hydrogen atom is in one position $a$ and the indicated group

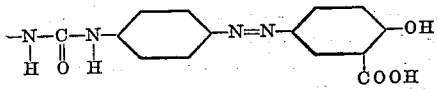

is in the other position $a$, which products are yellow to orange, reddish and brown powders which, in the form of their alkaline salts, dissolve in water to form yellow solutions and which dye the cellulose fiber yellow shades the fastness of which to wet agents may be improved by treatment with copper salts.

7. The disazo dyestuffs which are asymmetric urea derivatives and which, in the free state, correspond to the general formula

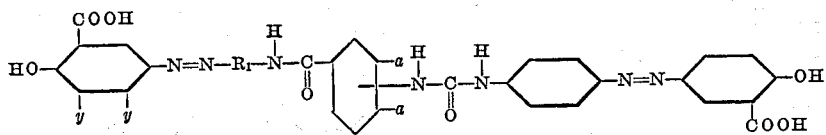

wherein one $y$ stands for a SO$_3$H-group and the other $y$ for a hydrogen atom, wherein, also, R$_1$ stands for an aromatic nucleus of the benzene series, in which the —N=N— and the

groups stand in the 1:4-position to one another, and wherein finally a hydrogen atom is in one position $a$ and the indicated group

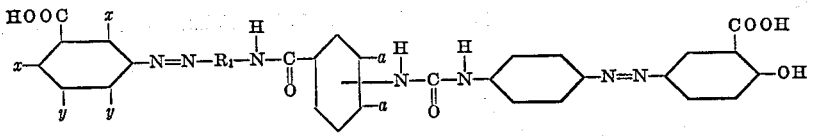

is in the other position $a$, which products are yellow to orange, reddish and brown powders which, in the form of their alkaline salts, dissolve in water to form yellow solutions and which dye the cellulose fiber yellow shades the fastness of which to wet agents may be improved by treatment with copper salts.

8. The disazo dyestuffs which are asymmetric urea derivatives and which, in the free state, correspond to the general formula

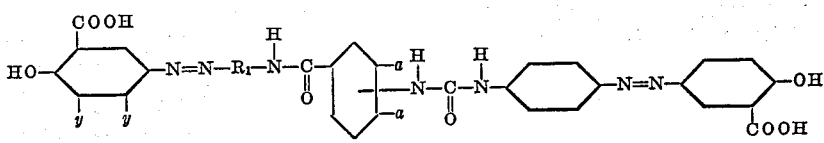

wherein one $y$ stands for a SO$_3$H-group and the other $y$ for a hydrogen atom, wherein, also, R$_1$ stands for an aromatic nucleus of the benzene series, carrying in ortho-position to the

group an O—CH$_3$-group, and wherein further the —N=N— and the

groups stand in the 1:4-position to one another, and wherein finally a hydrogen atom is in one position $a$ and the indicated group

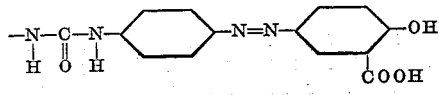

is in the other position $a$, which products are yellow to orange, reddish and brown powders which, in the form of their alkaline salts, dissolve in water to form yellow solutions and which dye the cellulose fiber yellow shades the fastness of which to wet agents may be improved by treatment with copper salts.

9. The product which, in free state, corresponds to the formula

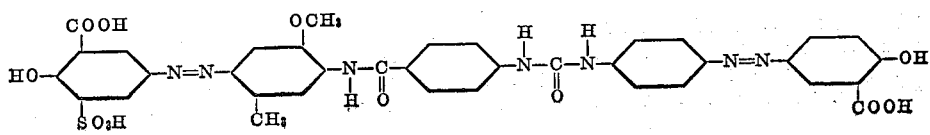

10. The product which, in free state, corresponds to the formula
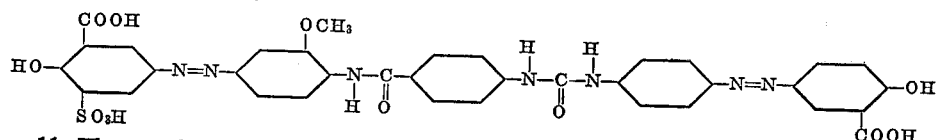
11. The product which, in free state, corresponds to the formula
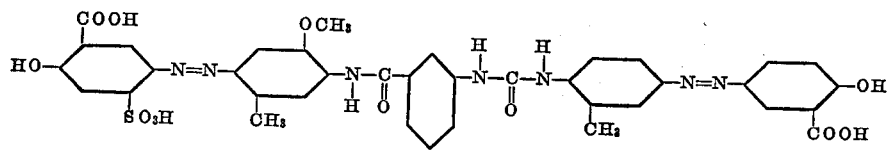
OTTO KAISER.